US006729749B2

United States Patent
Kondo et al.

(10) Patent No.: US 6,729,749 B2
(45) Date of Patent: May 4, 2004

(54) AUTOMATIC HEADLIGHT AXIS DIRECTION CONTROL FOR VEHICLES

(75) Inventors: Masanori Kondo, Nagoya (JP); Kunio Ohashi, Toyota (JP); Yuji Yamada, Okazaki (JP); Yoshiyuki Miki, Susono (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/986,458

(22) Filed: Nov. 8, 2001

(65) Prior Publication Data

US 2002/0057573 A1 May 16, 2002

(30) Foreign Application Priority Data

Nov. 10, 2000 (JP) .......................... 2000-342814

(51) Int. Cl.⁷ ................................. B60Q 1/08
(52) U.S. Cl. ................. 362/466; 362/467; 362/526
(58) Field of Search ................. 362/466, 467, 362/526; 382/465

(56) References Cited

U.S. PATENT DOCUMENTS

| | | | | |
|---|---|---|---|---|
| 4,833,573 A | * | 5/1989 | Miyauchi et al. | 362/71 |
| 4,868,720 A | * | 9/1989 | Miyauchi et al. | 362/69 |
| 5,010,457 A | * | 4/1991 | Ohmamyuda et al. | 362/66 |
| 5,217,087 A | * | 6/1993 | Ikegami et al. | 180/219 |
| 5,645,338 A | * | 7/1997 | Kobayashi | 362/61 |
| 6,049,749 A | * | 4/2000 | Kobayashi | 701/49 |
| 6,109,759 A | * | 8/2000 | Tanabe et al. | 362/42 |
| 6,305,823 B1 | * | 10/2001 | Toda et al. | 362/276 |

* cited by examiner

*Primary Examiner*—Alan Cariaso
*Assistant Examiner*—Jacob Y. Choi
(74) *Attorney, Agent, or Firm*—Posz & Bethards, PLC

(57) ABSTRACT

A DC motor is driven with a predetermined driving signal thereto before a headlight axis direction control is started by using a headlight axis control angle calculated on a basis of a variety of sensor information and a positional signal from a potentiometer. If there is no variation in the positional signal, a failure in the driving system of the DC motor is decided to exist. Therefore, for example, if failure detection is implemented when an ignition switch to start an engine is turned on, the failure in the driving system of the DC motor is detected before the headlight needs to be turned on. Thereby, reliability in the system for headlight axis direction control is able to be improved.

11 Claims, 5 Drawing Sheets

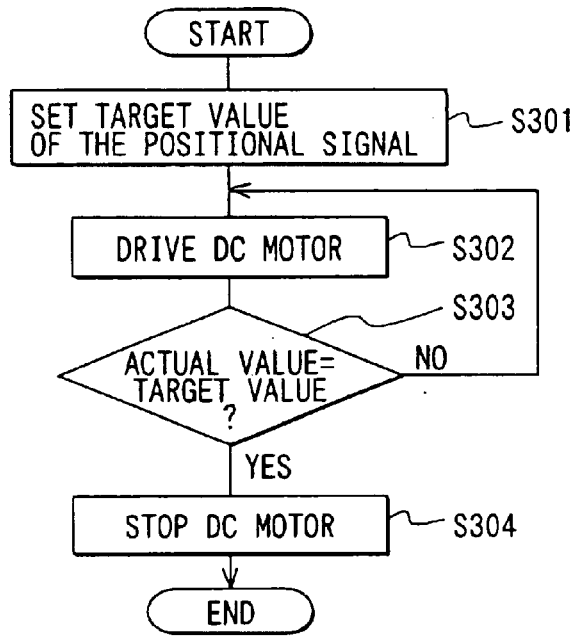
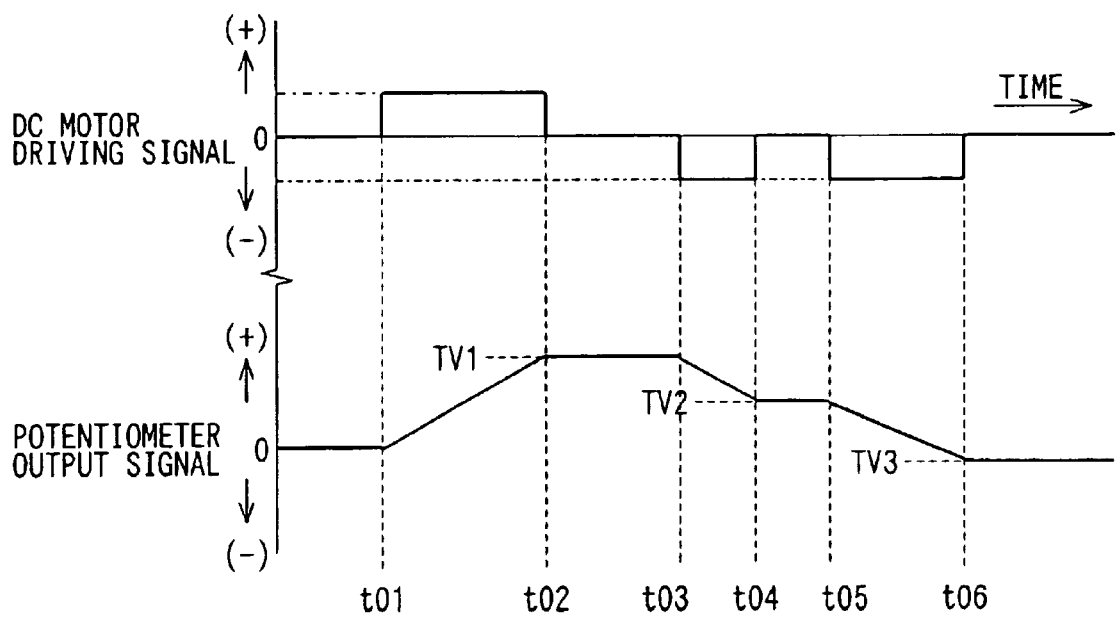

AUTOMATIC HEADLIGHT AXIS DIRECTION CONTROL FOR VEHICLES

CROSS REFERENCE TO RELATED APPLICATION

This application is based on and incorporates herein by reference Japanese Patent Application No. 2000-342814 filed on Nov. 10, 2000.

BACKGROUND OF THE INVENTION

The present invention relates to automatic headlight axis direction control system and method that adjust automatically the axis of light emitted by a headlight of a vehicle.

Conventionally, an automatic headlight axis direction control system that uses a DC motor as an actuator to adjust a headlight axis direction of a vehicle is proposed. A certain position equivalent to an actual headlight axis direction is detected by a potentiometer or the like as a position detection sensor disposed side-by-side to the DC motor after a DC current is applied to the DC motor. Subsequently, the headlight axis is moved by the DC motor to a direction predetermined on a basis of the position detected by the potentiometer. Therefore, a headlight axis direction control using the DC motor provides an advantage that the headlight axis direction control is able to be started immediately when a headlight switch is turned on because the headlight axis direction is monitored in real time.

However, the DC motor is not driven until the headlight axis direction control is needed. Thus, whether a failure exists in a driving system for the DC motor is not detected before the axis control is started.

Therefore, only after the headlight switch is turned on, the failure is detected for the first time if a driver is enabled to recognize a deviation from the normal headlight control characteristic. Unless the driver perceives the failure, the vehicle travels with the failure in the headlight and the headlight axis direction control is not performed at all.

Furthermore, if there is a significant deviation from the normal headlight control characteristic due to a failure in the DC motor driving system, as a result, oncoming traffic incurs glaring light and/or adequate forward visibility is not provided.

SUMMARY OF THE INVENTION

It is an object of the present invention to provide automatic headlight axis direction control system and method that include a function that a failure in a driving system of an actuator used for adjusting a headlight axis direction of a vehicle is detected before a light axis direction control is started, thereby improving reliability the headlight axis direction control.

According to the present invention, an actuator is driven with a predetermined current output thereto before a headlight axis direction control is started by using a headlight axis control angle calculated on a basis of a variety of sensor information. At that time, if there is no variation in an output from a potentiometer, a failure in the driving system of the actuator is decided to exist. Therefore, for example, if failure detection is implemented when an ignition switch to start an engine is turned on, the failure in the driving system of the actuator is detected before the headlight needs to be turned on.

BRIEF DESCRIPTION OF THE DRAWINGS

The above and other objects, features and advantages of the present invention will become more apparent from the following detailed description made with reference to the accompanying drawings. In the drawings:

FIG. 7 is a flow chart showing a procedure for normal headlight axis control executed in the embodiment; and FIG. 8 is a time chart showing transitions of a DC motor driving signal and of an outputted signal from the potentiometer in the embodiment.

DETAILED DESCRIPTION OF THE PREFERRED EMBODIMENT

The present invention will be described in detail with reference to a preferred embodiment.

Figure 1:
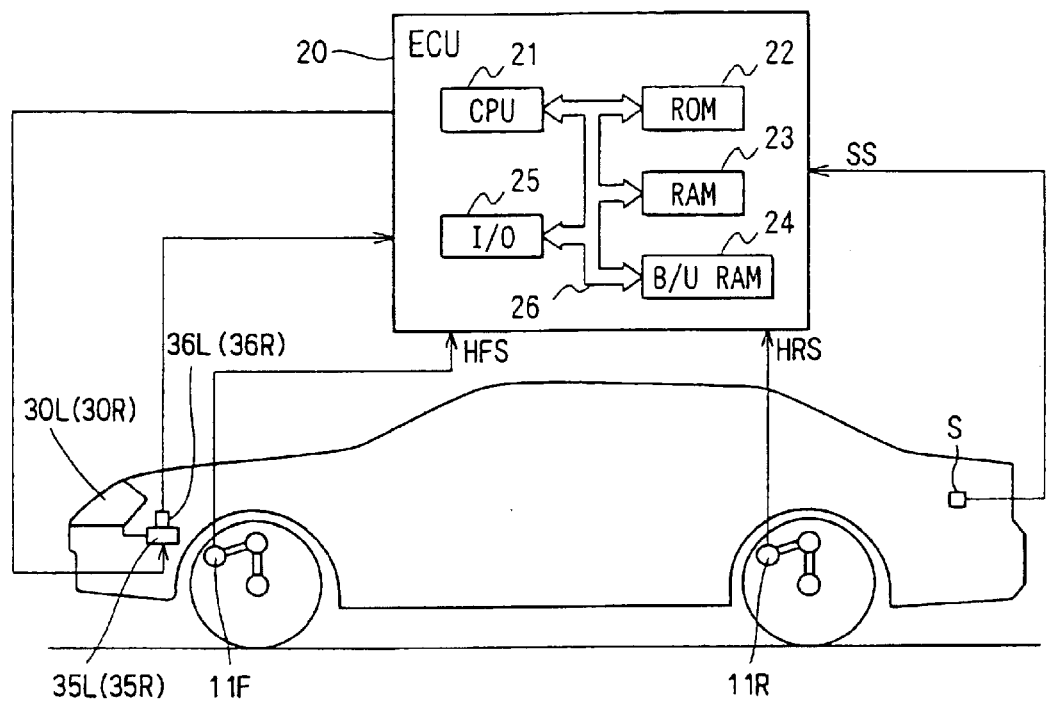
FIG. 1 is a schematic view showing an automatic headlight axis direction control system for a vehicle according to an embodiment of the present invention.

As shown in FIG. 1, vehicle height sensors 11F and 11R are attached to front and rear axles at either driver's seat side or passenger's seat side, respectively. Height value HF calculated on a basis of a height signal HFS from the sensor 11F, height value HR calculated on a basis of a height signal HRS from the sensor 11R, and a variety of sensor signals SS from other sensors S are inputted to an ECU (Electronic Control Unit) 20 mounted in a vehicle. Each of the height values HF and HR are a differential between local real height and nominal vehicle height. In FIG. 1, the ECU 20 is illustrated outside a vehicle for convenience.

The ECU 20 is a logical calculation circuit composed of a CPU 21 that is a central processing unit for a variety of calculations, a ROM 22 in which a control program is stored, a RAM 23 in which a variety of data is stored, a backup RAM 24, an I/O (input-output) circuit 25, a bus line 26 interconnecting the above circuit, or the like.

Right and left headlights 30L and 30R of the vehicle have respectively DC motors 35L and 35R to control headlight axes thereof. Potentiometers 36L and 36R are disposed side-by-side with the DC motors 35L and 35R, respectively. A positional signal PS outputted from each of the potentiometers 36L and 36R is inputted into the ECU 20. As described hereinafter, in response to the positional signal PS from the potentiometer 36L (36R) and other sensor signals SS, a headlight axis control angle for adjusting headlight axis direction for the headlight 30L (30R) is calculated and the DC motor 35L (35R) is driven to adjust the axis direction of the headlight 30L (30R).

Figure 2:
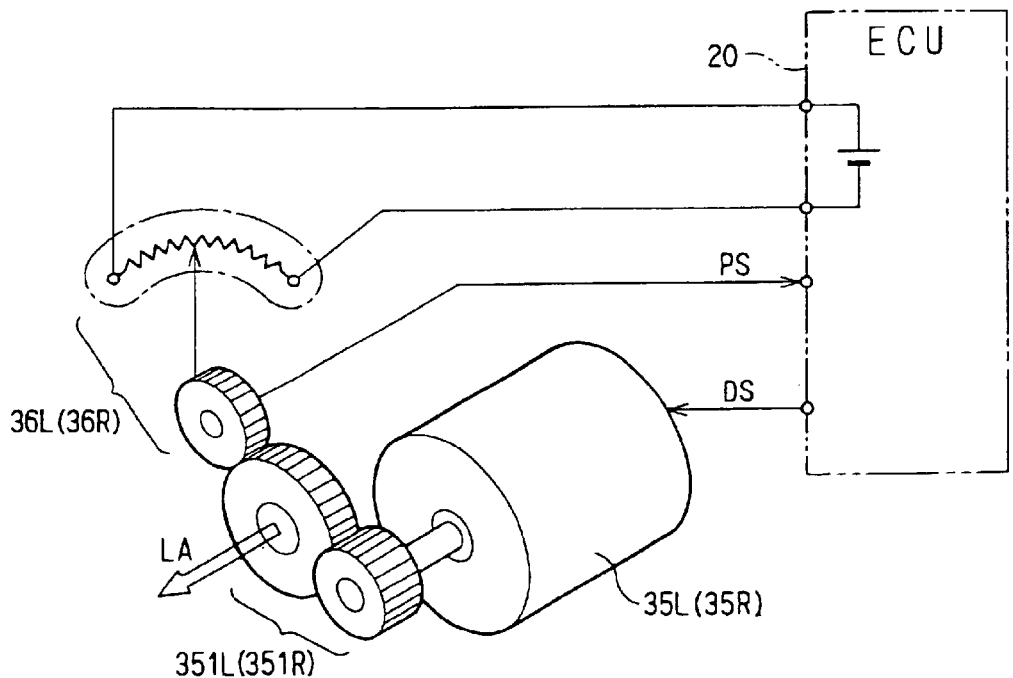
FIG. 2 is a schematic view showing a relation in mechanical interconnection among a DC motor for adjusting a headlight axis direction, a set of gear series for moving the headlight axis, and a potentiometer in the embodiment.

As shown in FIG. 2, the DC motor 35L (35R) is driven in response to a driving signal DS for the DC motor from the ECU 20 and rotates gear series 351L (351R). Thereby, headlight axis LA denoted by an open arrow sign is moved and the axis direction of the headlight 30L (30R) is controlled. A predetermined voltage from the ECU 20 is applied between both terminals of the potentiometer 36L (36R) and intermediate terminal disposed between both terminals makes a rotary movement when the gear series 351L (351R) is rotated. Thereby, the real time divided voltage of the potentiometer 36L (36R) is outputted into the ECU 20 as the positional signal PS.

Hereinafter, an entire processing routine for the headlight axis control in the CPU 21 of the ECU 20 is explained by using a flow chart shown in FIG. 3. This processing routine is started in the CPU 21 when an ignition switch (not illustrated) is turned on for engine starting or immediately after an engine starting.

Figure 3:
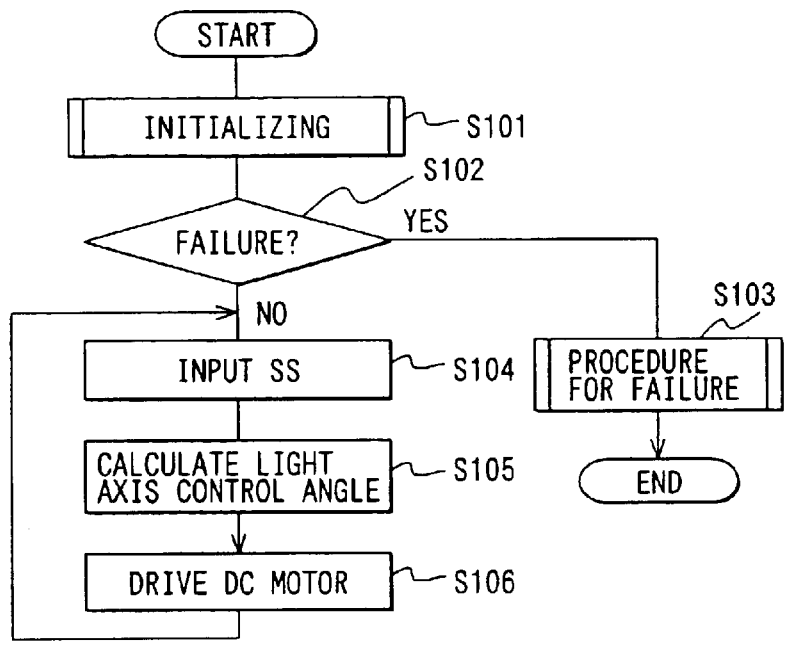
FIG. 3 is a flow chart showing headlight axis control in a CPU included in an ECU utilized in the embodiment.

As shown in FIG. 3, initialization is done at step S101 in the first place. In the initialization, predetermined current is outputted from the input-output circuit 25 as a motor driving current to the DC motor 35L (35R). At the next step S102, whether there are any failures in the driving system of the DC motor 35L, 351L (35R, 351R) is decided.

Specifically, the failure decision is based on the variation of the positional signal PS from the potentiometer 36L (36R) when the predetermined current is outputted to the DC motor 35L (35R) at the step S101. If the positional signal PS from the potentiometer 36L (36R) varies within a predetermined range, the driving system of the DC motor 35L, 351L (35R, 351R) is decided to be normal because there is a positional change in the driving system 35L, 351L (35R, 351R). On the other hand, if the positional signal PS from the potentiometer 36L (36R) does not vary or varies out of the predetermined range, the driving system of the DC motor 35L, 351L (35R, 351R) is decided to have a failure because there is no proper positional change in the driving system 35L, 351L (35R, 351R).

Whether the positional signal PS is within the predetermined range is determined on a basis of two requirements mentioned below. One is that the outputted signal from the potentiometer is within a designed range. The other is that the driving signal DS for the DC motor and an output variation from the potentiometer are identical in fluctuation thereof, namely, the output from the potentiometer results in becoming larger when the DC motor is driven in the direction where the output from the potentiometer is designed to become larger.

Failures in the driving system of the DC motor 35L, 351L (35R, 351R) include the case that the driving system 35L, 351L (35R, 351R) is not operated because some parts in the headlight 30L (30R) is caught by something, in addition to an abnormal driving performance of the DC motor 35L (35R).

If any failures are decided to exist at step S102, namely, there are any failures in the driving system 35L, 351L (35R, 351R), the next step S103 is executed. As a procedure for dealing with the failures, for example, a warning lamp on an instrumental panel is turned on, and/or power supply to the DC motor 35L (35R) is stopped, and afterward the routine is finished.

On the other hand, if no failures in the driving system 35L, 351L (35R, 351R) are decided to exist at step S102, the next step S104 is executed to input a variety of sensor signals SS of the vehicle. Subsequently, the next step S105 is executed and a pitch angle $\theta_P$, that is a tilt angle from a predetermined reference plane extending to the vehicle traveling direction, is calculated by the following equation eq. 1 by using the height values HF and HR from the sensors 11F and 11R in all sensor signals inputted at the step S104. In the equation, $L_W$ is a wheel base that is a distance between the front axle and the rear axle.

$$\theta_P = \tan^{-1}\{(HF-HR)/L_W\} \qquad \text{eq. 1}$$

A headlight control angle $\theta_A$, with which the headlight 30L (30R) does not give glaring light to oncoming traffic, is calculated from a equation using the pitch angle $\theta_P, \theta_A \approx -\theta_P$. Afterward, the next step S106 is executed to drive the DC motor 35L (35R) on a basis of the light control angle $\theta_A$ calculated at the step S105 for adjusting the light axis direction of the headlight 30L (30R). The light control angle $\theta_A$ under a normal control procedure for the headlight 30L (30R) is compensated such that the adjusted light axis direction provides a 1% tangent angle, namely, about 0.57 degree angle, below the predetermined reference plane to ensure driver's visibility without giving glaring light to vehicles traveling ahead or the like. After the above step S106, the step S104 is executed again, and subsequently the steps S105 and S106 are executed repeatedly. Headlight axis direction control of the headlight 30L (30R) in the direction perpendicular to the vehicle traveling one is omitted in this embodiment.

Figure 4:
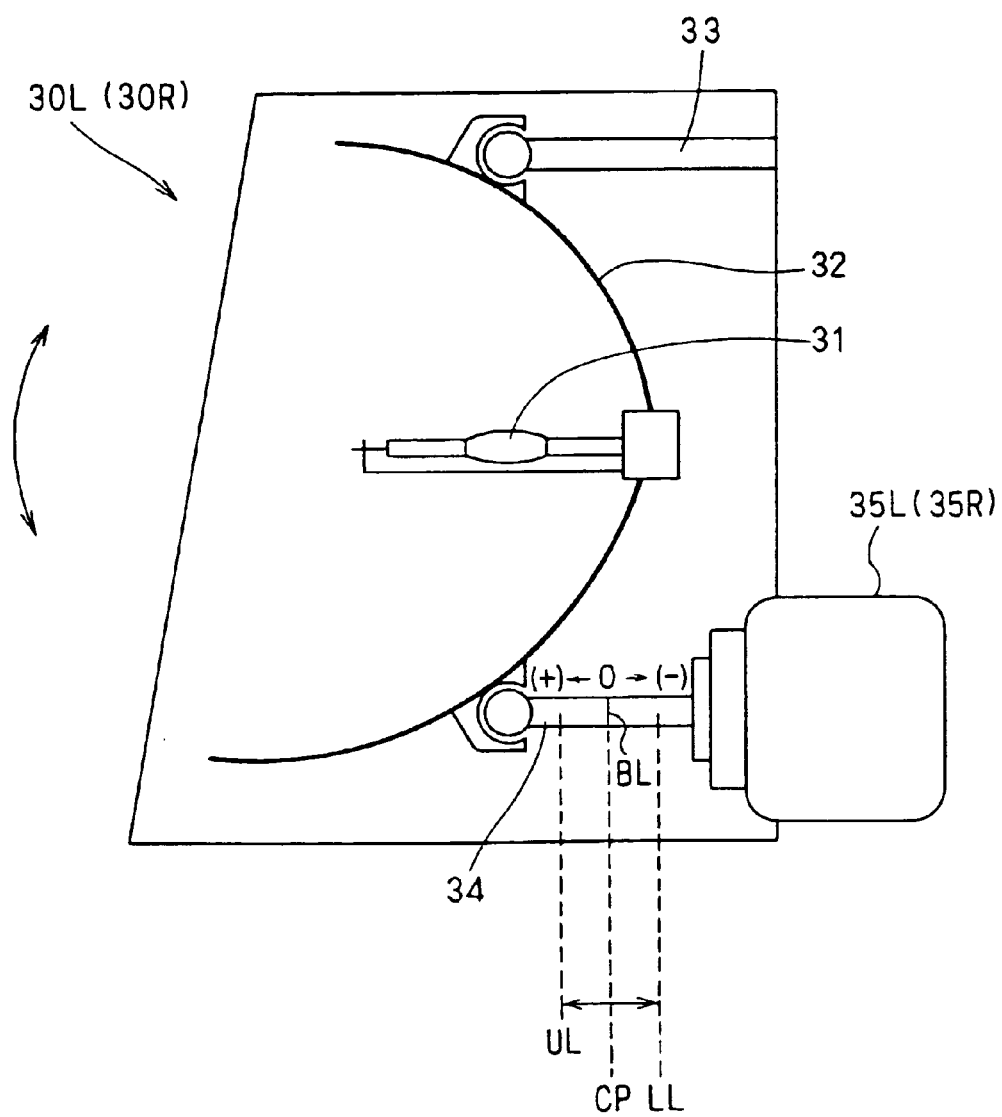
FIG. 4 is a cross-sectional view showing a partial structure of a headlight in the embodiment.

As shown in FIG. 4, the headlight 30L (30R) is mainly composed of a lamp 31, a reflector 32 that fixes the lamp 31, a support rod 33 that is a rod-shaped part supporting the reflector 32 such that the reflector 32 can be moved in a direction denoted by an arc-shaped arrow, a movable rod 34 that is a movable rod-shaped part supporting the reflector 32, and the DC motor 35L (35R) that drives the movable rod 34 in a direction denoted by straight arrows. The movable rod 34 is driven by the DC motor 35L (35R) in the direction denoted by the straight arrows to rotate the reflector 32 around the end of the support rod 33 such that the reflector 32 is tilted by the headlight axis control angle described above in the vertical direction, thereby the light axis of the headlight 30L (30R) is adjusted.

The movable rod 34 whose position determines the light axis angle of the headlight 30L (30R) is initially set such that a virtual base line BL provided on the rod 34 is in coincidence with a center position CP denoted by zero (0) on a fixed virtual scale as shown in FIG. 4, and is driven both in a plus (+) side range between the center position CP and an upper limit position UL and in a minus (−) side range between the center position CP and a lower limit position LL.

Hereinafter, on a basis of components shown in FIG. 4, the initializing routine S101 of the headlight axis direction control in the CPU 21 of the ECU 20 is explained more fully with reference to a flow chart shown in FIG. 5 and FIG. 6. The initializing routine is started in the CPU 21 when the ignition switch (not illustrated) is turned on or after the engine is started.

Figure 5:
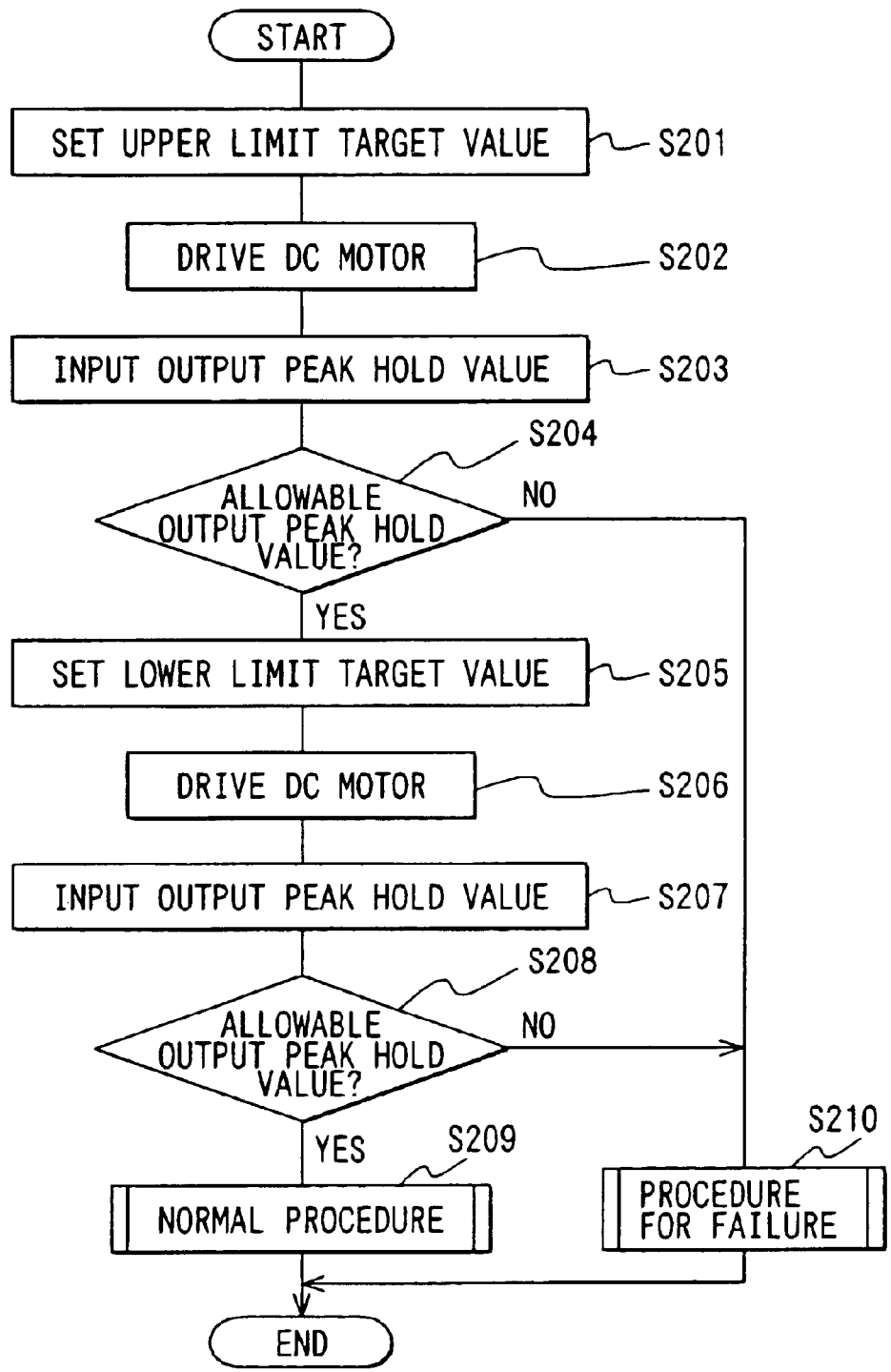
FIG. 5 is a flow chart showing an initializing procedure for the headlight axis control executed in the embodiment.

As shown in FIG. 5, at step S201, a target output signal of the potentiometer 36L (36R) is set. The signal is equivalent to a signal at the upper limit position UP shown in FIG. 6 when the movable rod 34 is moved from the center position CP to the upper limit position UL shown in FIG. 4, namely when the movable rod 34 is moved from the initial position IP at time t1 to the upper limit position UP at time t2 as shown in FIG. 6. At the next step S202, the driving signal DS for the DC motor 35L (35R) is outputted into DC motor 35L (36R) during a time period between t1 and t2 shown in FIG. 6 on a basis of the target value set at the step S201 and the light axis direction of the headlight 30L (30R) is adjusted such that the positional signal PS from the potentiometer 36L (36R) indicates a target value at the upper limit position UP shown in FIG. 6. Subsequently, at the next step S203, an output peak hold value of the positional signal PS from the potentiometer 36L (36R) at time t2 is inputted.

Figure 6:
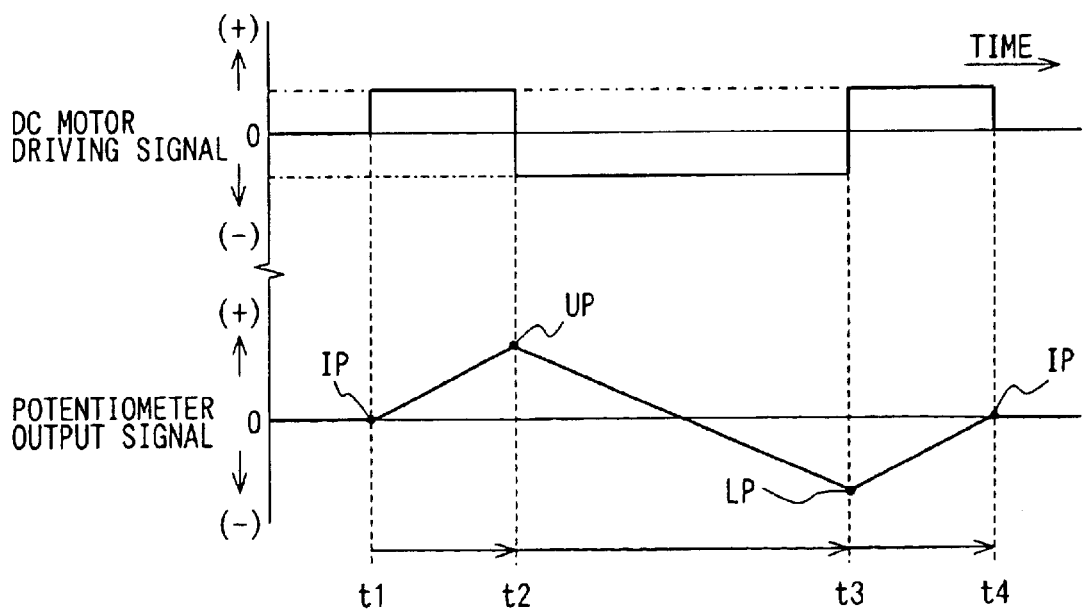
FIG. 6 is a time chart showing transitions of a DC motor driving signal and of an outputted signal from the potentiometer in the embodiment.

At the next step S204, whether the output peak hold value inputted at the step S203 equivalent to the signal at the upper limit position UP shown in FIG. 6 is within a predetermined range is determined. If the output peak hold value is within the predetermined range, the next step S205 is executed. At step S205, another target output signal of the potentiometer 36L (36R) is set. The signal is equivalent to a signal at the lower limit position LP shown in FIG. 6 when the movable rod 34 is moved from the upper limit position UL to the lower limit position LL shown in FIG. 4, namely when the movable rod 34 is moved from the upper limit position UP at time t2 to the lower limit position LP at time t3 as shown in FIG. 6. At the next step S206, another driving signal DS for the DC motor is outputted into DC motor 35L (36R) during a time period between t2 and t3 shown in FIG. 6 on a basis of the target value set at the step S205, and the light axis direction of the headlight 30L (30R) is adjusted such that the positional signal PS from the potentiometer 36L (36R) indicates the target value at the lower limit position LP shown in FIG. 6. Subsequently, at the next step S207, another output peak hold value of the positional signal PS from the potentiometer 36L (36R) at t2 is inputted.

At the next step S208, whether the output peak hold value inputted at the step S207 is within another predetermined range is determined. If the output peak hold value is within the predetermined range, the driving system of the DC motor 35L, 351L (35R, 351R) is determined to be normal, and the routine is finished after a normal procedure is executed at the next step S209. As the normal procedure at the step S209, the driving signal DS for driving the DC motor 35L (35R) is supplied while the movable rod 34 driven by the DC motor 35L (35R) is moved from the lower limit position LL to the center position CP shown in FIG. 4, namely, during a time period between t3 and t4 shown in FIG. 6, and the light axis direction of the headlight 30L (30R) returns such that the positional signal PS from the potentiometer 36L (36R) indicates the target value at the initial position IP shown in FIG. 6.

On the other hand, if any of the output peak hold value at the upper limit position UP or the output peak hold value at the lower limit position LP is decided to be out of the predetermined range at the step S204 or the step S208, namely, a failure is decided to exist in the driving system of the DC motor 35L, 351L (35R, 351R), the next step S210 is executed to deal with the failure. Afterward, the routine is finished. As described above, as a procedure for treating the failure, for example, a warning lamp on an instrumental panel is turned on, and/or power supply to the DC motor 35L (35R) is stopped.

Hereinafter, the normal routine of the light axis control in the CPU 21 of the ECU 20 is explained with reference to FIG. 7 and FIG. 8. The normal routine is started on a predetermined interval basis after the initializing routine.

As shown in FIG. 7, a target value of the positional signal PS is set at step S301. After that, the next step S302 is executed. The driving signal is outputted to the DC motor 35L (35R) on a basis of the target values set at the step S301, and the light axis direction of the headlight 30L, 30R is adjusted such that the positional signal PS from the potentiometer 36L (36R) provides the target value.

For example, a first target value TV1, a second target value TV2, and a third target value TV3 are taken for an explanation as shown in FIG. 8. A plus side driving signal is supplied during a period between time t01 and t02, no signal is supplied during a period between time t02 and t03 and another period between time t04 and t05, and a minus side driving signal is supplied during a period between time t03 and t04 and a period between time t05 and t06. Thereby, the light axis direction of the headlight 30L, 30R is adjusted such that the positional signal PS from the potentiometer provides the first target value TV1, the second target value TV2, and the third target value TV3 in order.

The next step S303 is executed to decide whether the positional signal is practically equal to the target value. Unless a predetermined condition is satisfied at the step S303, the step S302 is executed again. If the predetermined condition is satisfied at the step S303, namely, the positional signal PS is practically equal to the target value, the next step S304 is executed. A predetermined current supply for the DC motor 35L (35R) is stopped, thereby the driving system of the DC motor 35L, 351L (35R, 351R) is stopped, and the routine is finished.

As in the embodiment described above, if failure detection by the initializing routine is implemented when the ignition switch to start an engine is turned on, a failure in the driving system of the DC motor 35L, 351L (35R, 351R) is detected before the headlight 30L (30R) needs to be turned on. Thereby, reliability in a system for light axis direction control of the headlight 30L (30R) is improved.

If the failure of the driving system of the DC motor 35L, 351L (35R, 351R) is detected, for example, the warning lamp is turned on, thereby drivers are enabled to recognize the failure and be urged to have the system fixed. In addition, for example, coils of the DC motor 35L (35R) are prevented from burning by stopping the current supply to the DC motor 35L (35R).

In the embodiment of the present invention, the DC motor 35L (35R) and the potentiometer 36L (36R) are utilized as means for adjusting the leadlight axis direction and for the position detection equivalent to the axis direction, respectively. However, instead of a DC motor, other actuators may be used. Instead of a potentiometer, any means that enable control position detection may be used. The present invention is able to be applied to a method where the pitch angle $\theta_P$ is estimated by using a single vehicle height sensor mounted to either of the front side or the rear side of a vehicle.

Other modification and alterations are also possible without departing from the spirit of the invention.

What is claimed is:

1. An automatic headlight axis direction control system comprising:
   a vehicle information detection means for detecting information used for controlling a light axis direction of a headlight;
   a control angle calculation means for calculating a light axis control angle;
   a light axis direction adjustment means for moving the light axis direction such that the light axis direction has the light axis control angle;
   a direction detection means for outputting a signal having a level correlated to the light axis direction of the headlight; and
   a failure detection means for detecting a failure in the light axis direction adjustment means based upon a predetermined value and the level of the signal that is outputted from the direction detection means when the light axis direction adjustment means is driven such that the direction detection means outputs the predetermined value unless a failure occurs in the light axis direction adjustment means before the light axis direction is controlled using the light axis direction adjustment means, wherein the failure detection occurs in response to an engine starting operation.

2. The automatic headlight axis direction control system as in claim 1 further comprising:

a failure dealing means for dealing with the failure in the light axis direction adjustment means.

3. The automatic headlight axis direction control system as in claim 1, wherein the failure detection occurs in response to an engine ignition switch operation.

4. The automatic headlight axis direction control system as in claim 1, wherein the failure detection means forcibly drives the light axis direction adjustment means in a predetermined direction irrespective of the calculated light axis control angle and compares the detected light axis direction with the predetermined direction.

5. The automatic headlight axis direction control system as in claim 1, wherein the direction detection means is a potentiometer and is operatively linked to the light axis direction adjustment means.

6. An electronic control unit for controlling a vehicle headlight axis direction of a vehicle headlight, the electronic control unit comprising:

a control angle calculation means for calculating a light axis control angle to adjust a light axis direction of the vehicle headlight based upon sensor signals received from vehicle sensors;

a light axis direction adjustment means for driving a motor to move the vehicle headlight axis direction in accordance with the light axis control angle; and a failure detection means for determining if the motor is in a failure state by outputting a predetermined test signal for driving the motor and comparing an output signal subsequently received from a potentiometer electronically coupled to the motor when the motor is driven to the predetermined test signal, and concluding that the motor is in the failure state if the output signal received from the potentiometer is not within a predetermined range associated with the predetermined test signal, wherein:

the failure detection means activates a failure indication and prevents operation of the motor when the failure state is detected prior to the vehicle headlight axis direction being moved; and the failure detection occurs in response to an engine starting operation.

7. The electronic control unit as in claim 6, wherein a central processing unit comprises the control angle calculation means, the light axis direction adjustment means and the failure detection means, the central processing unit for executing control programs stored in a memory source.

8. A method for detecting a failure of an automatically controlled headlight system, in which a headlight axis direction is automatically controlled, wherein the method comprises:

performing a failure detection operation to detect a failure of the automatically controlled headlight system, wherein the failure detection operation occurs in response to the starting of the engine, and the method includes:

moving a headlight in a predetermined direction; and detecting the actual position of the headlight axis, wherein detection of a failure depends on whether the actual position of the headlight axis differs from a predetermined headlight axis position.

9. The method of automatically controlling headlight axis direction as in claim 8 wherein the determining step starts in timed relation with an engine ignition switch operation.

10. The method of automatically controlling headlight axis direction as in claim 8 wherein the driving step drives the headlight to two limit angles as the predetermined headlight axis direction.

11. The method of automatically controlling headlight axis direction as in claim 8 comprising steps of:

detecting vehicle information;

calculating a headlight axis direction variable with the detected vehicle information when a headlight operation is needed and the failure detecting means detects no failure; and driving the headlight to the calculated headlight axis direction.

* * * * *